United States Patent
Petry et al.

(10) Patent No.: US 12,292,128 B2
(45) Date of Patent: May 6, 2025

(54) PRESSURE CONTROL VALVE

(71) Applicant: GEORG FISCHER ROHRLEITUNGSSYSTEME AG, Schaffhausen (CH)

(72) Inventors: Dirk Petry, Feuerthalen (CH); Oliver Trefz, Bonndorf (DE); Flavio Cantoni, Neuhausen (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 7 days.

(21) Appl. No.: 18/287,917

(22) PCT Filed: Apr. 1, 2022

(86) PCT No.: PCT/EP2022/058752
§ 371 (c)(1),
(2) Date: Oct. 23, 2023

(87) PCT Pub. No.: WO2022/228825
PCT Pub. Date: Nov. 3, 2022

(65) Prior Publication Data
US 2024/0191809 A1    Jun. 13, 2024

(30) Foreign Application Priority Data
Apr. 29, 2021   (EP) .................................. 21171086

(51) Int. Cl.
*F16K 27/02* (2006.01)
(52) U.S. Cl.
CPC ...... *F16K 27/0209* (2013.01); *F16K 27/0281* (2013.01)
(58) Field of Classification Search
CPC ................. F16K 27/0209; F16K 27/0281
See application file for complete search history.

(56) References Cited

U.S. PATENT DOCUMENTS

| 3,234,963 A | 2/1966 | Lyon |
| 2020/0056633 A1* | 2/2020 | Weingarten .......... F16K 27/0281 |
| 2020/0056634 A1* | 2/2020 | Bell ...................... F16K 15/044 |

FOREIGN PATENT DOCUMENTS

| DE | 102011056521 A1 | 6/2013 |
| DE | 102013111456 A1 | 4/2015 |

(Continued)

OTHER PUBLICATIONS

International Search Report (English and German) and Written Opinion of the ISA (German) issued in PCT/EP2022/058752, mailed Jul. 8, 2022; ISA/EP.

*Primary Examiner* — P. Macade Nichols
(74) *Attorney, Agent, or Firm* — Harness, Dickey & Pierce, P.L.C.

(57) ABSTRACT

A pressure control valve for controlling the pressure of gaseous and liquid media in pipelines, preferably in the drinking water field, containing: a main valve to which the pipeline is connected, wherein the main valve has a main valve housing, a guide cylinder, a valve element, channels for conducting the medium and a spring element, the valve element and the guide cylinder are arranged concentrically with respect to one another and the valve element is movably arranged on the guide cylinder; a control block, wherein the control block has channels for supplying the medium to the main valve and to the pilot valve; and a pilot valve for controlling the inspection pressure, wherein the pilot valve likewise has channels for guiding the medium, wherein the main valve, the control block and the pilot valve are medium-tightly interconnected by means of plug connections.

15 Claims, 3 Drawing Sheets

(56) References Cited

FOREIGN PATENT DOCUMENTS

Figure 1:
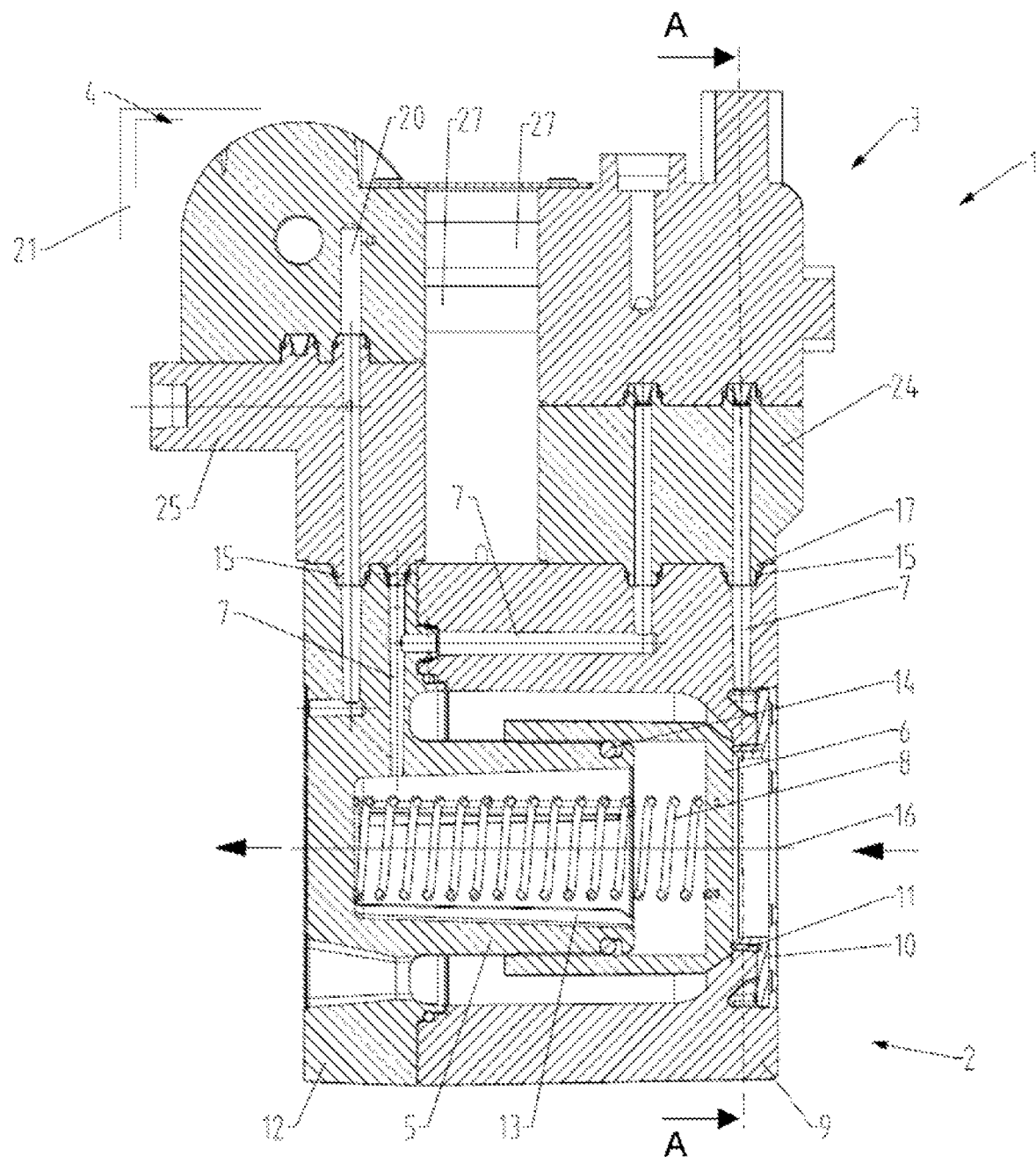

| | | |
|---|---|---|
| EP | 0655558 A1 | 5/1995 |
| GB | 2178139 A | 2/1987 |
| WO | 2017187155 A1 | 11/2017 |

* cited by examiner

A-A

PRESSURE CONTROL VALVE

CROSS-REFERENCE TO RELATED APPLICATIONS

This application is a U.S. National Phase application under 35 U.S.C. 371 of International Application No. PCT/EP2022/058752, filed on Apr. 1, 2022, which claims the benefit of European Patent Application No. 21171086.8, filed on Apr. 29, 2021. The entire disclosures of the above applications are incorporated herein by reference.

BACKGROUND

This section provides background information related to the present disclosure which is not necessarily prior art.

TECHNICAL FIELD

The invention relates to a pressure control valve for controlling the pressure or the input or output pressure of gaseous and liquid media in pipelines, preferably in the drinking water sector containing a main valve to which the pipeline is connected, wherein the main valve has a main valve housing, a guide cylinder, a valve element, channels for conducting the medium and a spring element, wherein the valve element and the guide cylinder are arranged concentrically to one another and the valve element is arranged displaceably on the guide cylinder, a control block, wherein the control block has channels for supplying the medium to the main valve and to the pilot valve and a pilot valve for control of the control pressure, wherein the pilot valve likewise has channels for conducting the medium.

DISCUSSION

Pressure control valves are used in drinking water supply to keep the pressure in the supply line constant, with pressure reduction valves (pressure after the valve at a constantly low pressure) and pressure retention valves (pressure before the valve at a constantly higher pressure) being used here. In principle, the function is achieved in that the flow flows through an aperture and a loss of pressure arises. The flow cross-section and the geometry can be changed by virtue of an actuating element being displaced. There are various designs. Valves produced from a cast body have hitherto primarily been known, in the case of which the aperture geometry is designed in a similar manner to a seat valve. The actuating body is moved by means of a diaphragm, wherein the diaphragm is acted upon from one side with a pressure, from the other side with a spring force, a balance state arises. The balance state can be changed via the pretensioning of the spring. The pilot valve controls the pressure on the diaphragm with the aid of a further constant in such a manner that the pressure in the pipeline is kept constant. As a result of the design and the production method, the components are separate structural elements which are connected via auxiliary valves (in general ball valves), bonded screw-in nipples and piping. As a result of this, the design becomes complex, assembly becomes complicated and the product becomes prone to faults in terms of imperviousness. Such a valve is disclosed in DE 10 2011 056 521 A1.

WO2017/187155 discloses a valve in which the actuating member is not at an angle to the direction of flow, but rather the direction of movement of the actuating member is in the direction of flow. This enables a more compact design and the fault- and wear-prone diaphragms are dispensed with. The individual components are nevertheless arranged separately from one another and have to be piped together and sealed off in a complex manner.

SUMMARY

This section provides a general summary of the disclosure and is not a comprehensive disclosure of its full scope or all of its features.

One aspect of the invention is to propose a compact pressure control valve which requires less assembly time and the imperviousness of the valve is ensured or there is barely any possibility that the valve is leaky as a result of mounting errors.

This aspect is achieved according to the invention in that the main valve, the control block and the pilot valve are connected to one another in a medium-impervious manner by means of plug connections. The main valve, the control block and the pilot valve are connected to one another exclusively via plug connections in a medium-impervious manner, i.e. the valve according to the invention has no screw connections which have to be sealed off so that no medium escapes.

The pressure control valve according to the invention for controlling the input or output pressure of gaseous and liquid media in pipelines includes a main valve, a control block and a pilot valve. The main valve has a main valve housing, a guide cylinder, a valve element, channels for conducting the medium and a spring element. Channels for conducting medium are arranged in the main valve housing. The guide cylinder is arranged on a main body of the main valve or formed as one part, wherein the base body is connected with an integrated guide cylinder preferably via plug connections to the main valve housing. The guide cylinder is formed to be hollow and as a result forms a part of a pressure chamber in which the spring element is arranged. The main valve preferably has a valve opening ring via which the medium flows in and a sealing element which closes the valve together with the valve element. The valve element is arranged concentrically on the guide cylinder, wherein the valve element is arranged displaceably on the guide cylinder. The valve element is preferably arranged on the outer diameter of the guide cylinder, wherein a reverse arrangement such that the valve element is arranged in the hollow guide cylinder is also conceivable. In the case of the preferred variant in the case of which the valve element is arranged on the outer diameter of the guide cylinder, as also in the case of the other variant, it is advantageous to provide at least one seal therebetween in order to seal off the size-adjustable pressure chamber which is formed by the valve element and the guide cylinder. This seal can be produced in various embodiments, ideally as an O-ring or X-ring. Depending on the transported medium, for the purpose of improved medium compatibility, this seal, as well as all the other seals installed in the pressure control valve, can be produced from various elastomer materials.

The pressure control valve preferably has a direction of action for opening and closing the valve parallel to the direction of flow of the medium. The installation location of the pressure control valve according to the invention can lie at an angle between 0° and 90°, wherein the flow flows from bottom to top. Due to the fact that the valve element has a direction of movement parallel to the direction of flow, the pressure control valve according to the invention is compact in terms of its design. The main flow of the medium does not undergo any change in direction or deflection in the pressure control valve according to the invention.

The control block arranged on the main valve and the pilot valve are connected via supplying and discharging channels in the control block and in the pilot valve to the main valve. The supplying channels in the control block or control channels serve to supply the medium to the control block and further preferably via line portions to the pilot valve, i.e. the main valve and the pilot valve are connected to one another by means of the channels in the control block.

A channel preferably runs from the main valve to the control block in that it is divided and extends on one hand to the pressure chamber and on one hand to the pilot valve. In the control block, the flow cross-section of the channel undergoes tapering, wherein the branching to the pressure chamber is arranged exactly in this tapering. It is thus achieved that a change occurs in the speed of flow at the point of the cross-sectional tapering if a change in pressure occurs in the medium in the pipeline. This means that when the speed of flow in the cross-sectional tapering is increased, this generates an eddy which reduces the pressure in the pressure chamber and vice versa. The pilot valve likewise has channels for conducting medium and pressure control. The main valve, the control block and the pilot valve are connected to one another in a medium-impervious manner by means of plug connections. This means that the pressure control valve according to the invention does not require any pipelines which have screw connections in order to achieve a medium-impervious connection which conducts the medium from one component or structural element to the other. This also has the advantage that the pressure control valve according to the invention can be assembled in a modular fashion. Since the plug connections are preferably formed uniformly, and their arrangements are also identical, in each case the same control block and the same pilot valve can be attached to different dimensions of main valves, which enables low-cost production of different dimensions of the pressure control valve. It is furthermore possible to convert a pressure retention valve into a pressure control valve or vice versa by exchanging the control block and pilot valve, as a result of the modular structure and the simple plug connections which have the structural elements or components and as a result are compatible with one another.

In the case of the present invention, the medium-conducting channels are integrated into the individual structural elements and are not visible from the outside. This means that the pressure control valve according to the invention does not require any pipelines which have screw connections in order to thus achieve a medium-impervious line which conducts the medium from one component or structural element to the other. The pressure control valve according to the invention furthermore does not have any visible pipelines which do not extend parallel to the direction of flow.

It is advantageous if the medium-conducting channels in the main valve, control block and pilot valve are connected to one another in a medium-impervious manner via the plug connections. Due to the fact that the plug connections are arranged at the outputs and inputs of the channels, it is ensured that the transition from one component to the other is impervious. A sealing element is preferably arranged on the plug connection to ensure imperviousness.

It has been shown to be advantageous if the plug connections on the main valve all lie in one plane, wherein the plane preferably runs parallel to the center axis, wherein the center axis runs parallel to the direction of flow of the medium and parallel to the vertical axis running vertically to the center axis. This has the advantage that the main valve housing can be formed as an injection molded part, wherein other production methods such as, for example, additive manufacturing, etc. are also conceivable. In the case of production using the injection molding method, an arrangement of plug connections in the separating plane of the injection mold enables a simple and reliable production method. The injection mold can be formed by the arrangement of the plug connections in a plane through two half-shells which have their separating point in the plane or that the separating plane extends parallel to the center axis of the valve and the channels are halved by the separating plane. This enables the demolding of the plastic part produced using the injection molding process. In the case of a high number of channels which are to be provided in the pressure control valve as a result of the function of the valve, the planes are preferably arranged offset from the center axis or in parallel offset from the vertically running axis which runs through the center of the main valve, thus offset from the center of the main valve. This makes it possible preferably to provide a further plane on the pressure reduction valve which is likewise arranged offset from the vertical axis, as a result of which two planes are preferably formed on which the channels and plug connections are arranged, wherein the plug connections and channels which lie in the second plane are preferably arranged in the control block and pilot valve so that each structural element preferably only has one plane and in the case of production using the injection molding process the plastic part can be easily demolded since the mold is formed by two halves. Of course, one plane in the center is, however, also conceivable and in the case of not too many channels and plug connections definitely an optimum solution. Alternative configurations of the injection mold are definitely conceivable. It is, for example, advantageous if, for this purpose, the channels are formed by slides or plunging pins in the casting tool which are pulled out to demold the injection molded part. As a result of this, the separating point of the injection molding tool can also run in a different manner than through the plane as described above.

It is furthermore advantageous if the channels on the main valve all lie in one plane, wherein the plane preferably runs parallel to the center axis. Wherein it has been shown as a further preferred embodiment if the plane is arranged offset to the axis or in parallel offset to the vertically running axis which runs through the center of the main valve, wherein this is above all the case as mentioned above if a large number of channels and plug connections are to be provided on the pressure control valve. As already mentioned above, this enables a demolding of the injected plastic part. The base body of the main valve also has channels and plug connections which likewise lie in the same plane as in the case of the main valve housing.

According to one preferred embodiment, the plug connections are formed in each case by a push-in element and a corresponding receiving element in the structural element to be connected, wherein the push-in element is arranged integrally on the structural element or is formed with the structural element as one part and as a result is formed from the same material, preferably plastic. This has the advantage that a further separating point which would have to be sealed off can be avoided, and the mounting outlay is reduced by avoiding separating connection points. The push-in part is thus formed directly on the structural element, be it the main valve, the control block, the pilot valve, the base body or also on the pilot valve and control block adapters preferably arranged therebetween. All of the structural elements which can be plugged into one another of the valve according to the invention are preferably produced from plastic. It is furthermore advantageous if all of the structural elements which can be plugged into one another are produced using the injection molding method.

Alternatively, the plug connection is formed in each case by a push-in element and two opposing receiving elements, wherein the push-in element is formed as a separate structural element. The push-in element is preferably formed as a double nipple, wherein a receiving element is then located on both structural elements to be connected and the double nipple serves as a connecting element.

It is advantageous if the pressure control valve does not use any screw connections for medium-impervious connection of the channels. The pressure control valve according to the invention furthermore has no deflected pipelines which connect the individual structural elements of the pressure control valve to one another to conduct medium between the structural elements. It is advantage if visible lines are arranged on the pressure control valve such that they run exclusively in one plane, preferably parallel to the direction of flow.

It has been shown to be advantageous if, in the case of the pressure control valve according to the invention, the structural elements or components are fixed relative to one another by means of fastening means.

The structural elements or components, such as main valve, control block, pilot valve, control block adapter, pilot valve adapter, are preferably fixed to one another, wherein the fastening means are arranged in a non-sealing region between the components. Screws are preferably used as fastening means, wherein these can have self-cutting threads as well as those screws which are screwed to an existing internal thread in the counterpiece. Of course, quick-clamping connections or other fastening means are also conceivable to fix the components to one another.

The guidance of medium between pilot and main valve and/or control block and main valve is preferably not apparent from outside or the channels run exclusively in the housings, which reduces the risk of damage or manipulation. Apart from the medium-conducting connection between pilot valve and control block, all of the channels in the housings of the structural elements which are preferably produced using the injection molding process are correspondingly integrated into the structural element. It is advantageous if the medium-conducting connection between control block and pilot valve are formed by means of a line portion, wherein the line portion is likewise connected by pushing in with the control block and the pilot valve.

The pressure control valve according to the invention preferably has a control block adapter and/or a pilot valve adapter. This has the advantage that the channels are also intergrated in these structural elements and the channels run in a further plane in order to ensure pressure control in relation to the prevailing pressure at the input or output or with the aid of the adapters the channels in the various planes or the two planes are connected to one another. Of course, it would also be possible to arrange all the channels in the pressure control valve on the same plane, this being dependent on how many channels are required to achieve the desired function of the valve, which is why the adapters are optional and a control block and a pilot valve can be arranged directly on the main valve. This therefore means that the more channels the valve requires for control, the greater extent to which the channels have to be formed on different planes in order to not cross and thus be able to demold the structural element if it is formed as an injection molded part.

One advantageous embodiment lies in the fact that the plug connections between the control block adapter and the main valve and between the pilot valve adapter and the main valve are all oriented parallel in the same direction. This has the advantage of simple mounting which preferably can be automated without high outlay since there everything is mounted in the same direction and expensive robots with pivotable arms are not required for mounting. It is likewise advantageous if the plug connections between the adapters and the pilot valve as well as the control block are likewise oriented in the same direction, parallel too one another.

It has been shown as a further advantageous embodiment if at least two channels are arranged in each case in an adapter. Of course, even more channels can also run in the adapters or even the separately formed adapters for the control block and the pilot valve can be formed as an adapter. By combining as many as possible channels in the adapters, in turn the mounting outlay is reduced. The more channels in an adapter, the fewer structural elements or components have to be joined together.

The pressure control valve according to the invention can be used as a pressure reduction valve and pressure retention valve, wherein the function of the pressure control valve can be changed by exchanging the control block and the pilot valve. This means also that the corresponding function of a pressure reduction valve or a pressure retention valve is defined by the control block and the pilot valve. If these are now exchanged, which is possible without any problems as a result of the modular structure, the function is correspondingly changed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 2:
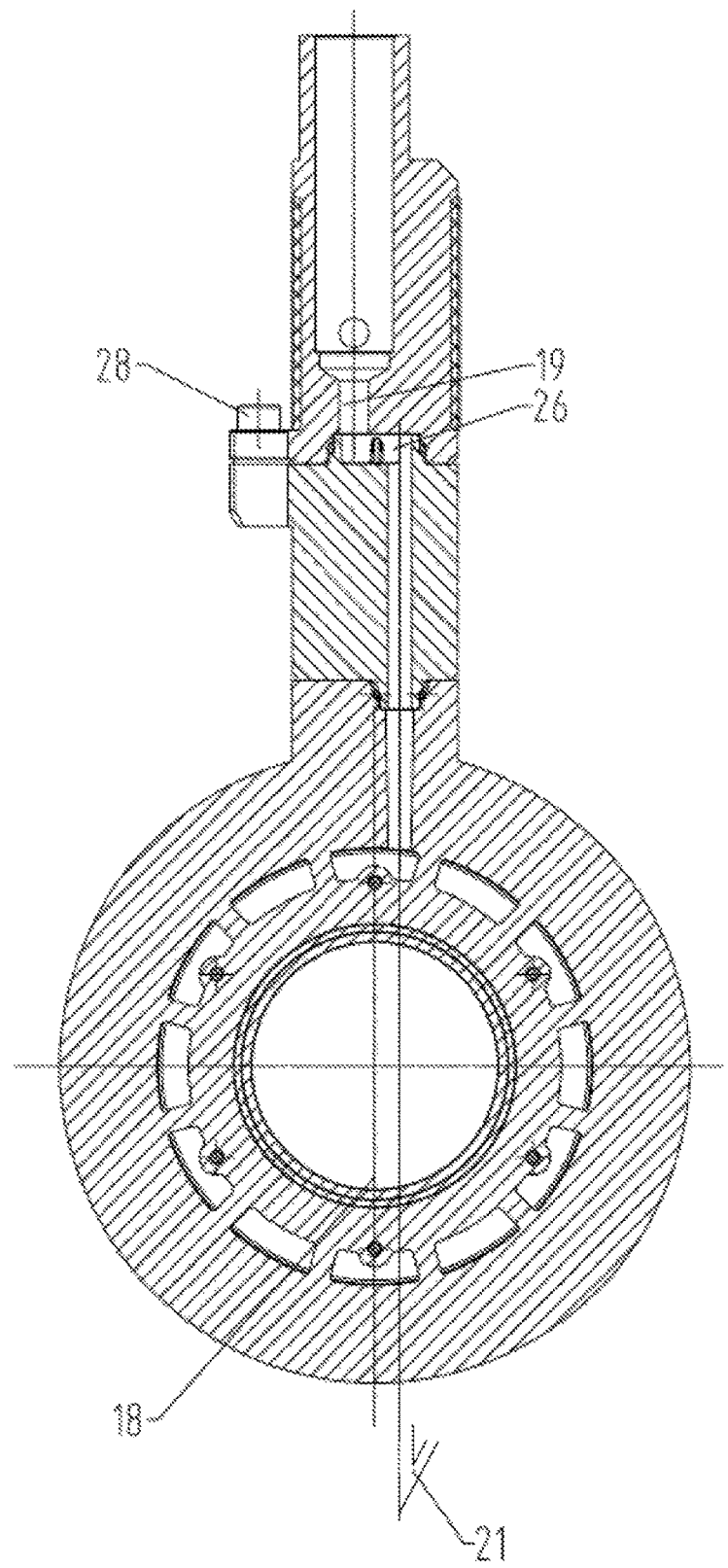
Figure 3:
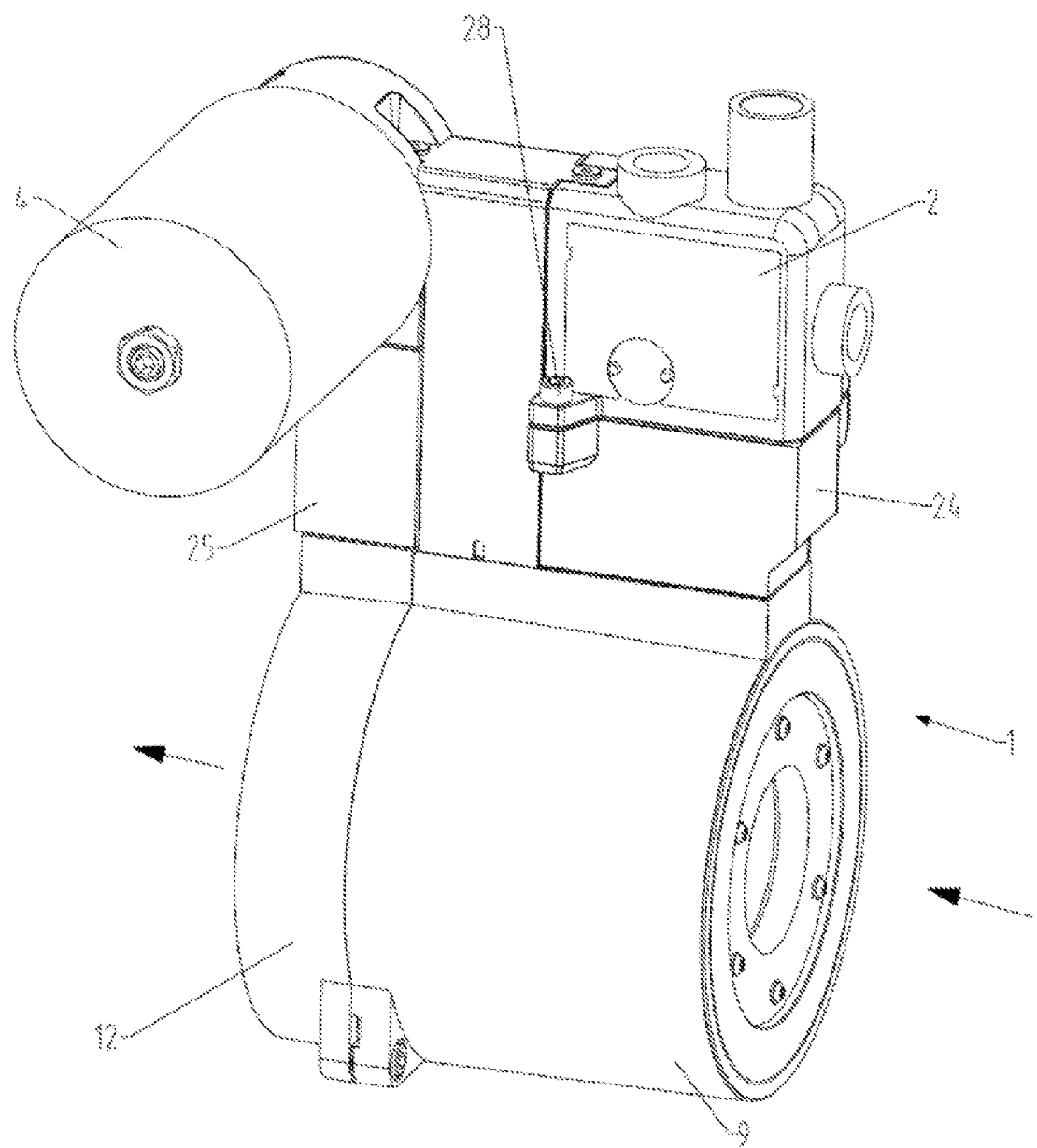
Figure 4:
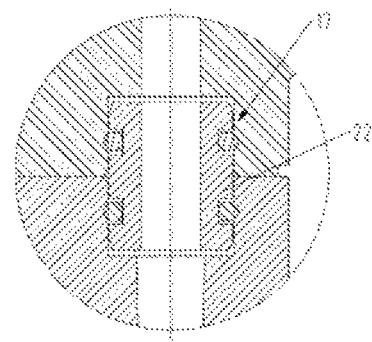

An exemplary embodiment of the invention is described on the basis of the figures, wherein the invention is not only restricted to the exemplary embodiment. In the figures:

FIG. 1 shows a pressure control valve according to the invention, wherein the sectional view runs through the plane in which the plug connections lie, FIG. 2 shows a cross-section A-A through the pressure control valve according to the invention, FIG. 3 shows a three-dimensional view of the pressure control valve according to the invention and FIG. 4 shows a cut-out of an alternative embodiment of a plug connection, wherein the push-in part is formed as a separate part.

DETAILED DESCRIPTION

Example embodiments will now be described more fully with reference to the accompanying drawings.

The drawing represented in FIG. 1 shows the pressure control valve 1 according to the invention in a sectional view, wherein the section is placed through the plane 21 in which the plug connections 17 and channels 7 of the main valve 2 are arranged. The pressure control valve 1 serves to control through-flowing media, preferably drinking water. The pressure control valve 1 has a main valve 2, wherein the main valve 2 has a guide cylinder 5, a valve element 6, channels 7 to conduct the medium and a spring element 8. The valve element 6 is preferably arranged on the outer diameter of the guide cylinder 5, wherein a reverse arrangement is also conceivable. The valve element 6 and the hollow guide cylinder 5 form a pressure chamber 13 which controls the position of the valve element and thus controls the input pressure or output pressure depending on whether the pressure control valve 1 according to the invention is formed as a pressure reduction valve or as a pressure retention valve. In order to seal off the pressure chamber 13, a seal 14 is arranged between the valve element 6 and the guide cylinder 5. A spring element 8 is furthermore located in the pressure chamber 13 in order to exert a constant pretensioning on the valve element 6. The guide cylinder 5 is arranged on the base body 12 or formed as one part. The main valve 2 has a main valve housing 9 which has the channels 7 for guiding the medium and controlling the valve 1. The medium flows via the valve opening ring 10 into the pressure control valve 1 and at the same time the medium is conducted via the channels 7 into the control block 3 and the pilot valve 4 in order to control the admissible input or output pressure with the aid of the pressure chamber 13. The medium is therefore conducted at the input of the valve 1 via the channels 7 in the main valve 2 further into the control block 2 into the channels 19 there and into the channels 20 in the pilot valve 3 and also into the pressure chamber 13 of the main valve 2. It is clearly apparent from FIG. 1 that the main valve 2, the control block 3 and the pilot valve 4 are connected to one another by means of plug connections 17 in a medium-impervious manner. It is advantageous if the plug connections 17 are arranged at the ends of the channels 7, 19, 20 which are also apparent in FIG. 2, as a result of which the connection of the structural elements to one another is performed via the channels 7, 19, 20 and these are simultaneously formed as a sealed transition as a result of the plug connections 17 which have a push-in element 22 and a corresponding receiving element 23. The plug connections 17 furthermore also has a sealing element 15.

It is furthermore clearly apparent from FIG. 1 that the plug connections 17 in the main valve 2 all lie in a plane 21 through which the section also runs. FIG. 2 shows the sectional profile A-A. The embodiment represented here has a plane 21 in which the plug connections 17 and also the channels 7 in the main valve 2 lie which offset to the vertical axis 18 which runs through the center of the main valve 1. Of course, a plane through the center would also be conceivable. The plane 21 or the fact that all the plug connections 17 and channels 7 lie in a plane 21 enables demolding if the main valve 2 or the main valve housing 9 is produced using the injection molding process. The base body 12 is likewise connected with a plug connection 17 to the main valve housing 9 in a medium-impervious manner and the channels 7 and plug connections 17 lie in the same plane. Of course, the main valve housing 9 can also be produced using the injection molding process if another mold partition of the injection mold is performed. To this end, the channels 7 are formed by slides on the molding tool which can be removed to demold the injection-molded part. It is advantageous if the push-in element 22 is formed in one piece with the structural element on which it is arranged. As a result of this, additional individual parts can be avoided such as joints which would have to be sealed up again. However, an alternative design is definitely conceivable in the case of which the plug connection 17 is formed by a separate push-in element 22 and is incorporated into two opposing receiving elements 23, as is apparent from FIG. 4. It is advantageous if the structural elements such as main valve housing 9, base body 12, control block 3, pilot valve 4 or the housing of the pilot valve, control block adapter 24 and also the pilot valve adapter 24 are produced from plastic and using the injection molding process. The plug connections 17 are formed in a uniform manner, as a result of which the pressure control valve 1 enables a modular structure.

As a result of this, e.g. the main valve 2 can be replaced by a different structural size and the control block 3 and the pilot valve 4 can be maintained. This also enables efficient production of the valve 1 in various dimensions as it is also possible to change the function of the pressure control valve by simply changing the control block 3 and the pilot valve 4, namely a pressure reduction valve can be easily converted into a pressure retention valve or vice versa. It is furthermore advantageous if the plug connections 17 between the control block adapter 24 and the main valve 2 and between the pilot valve adapter 25 and the main valve 2 are oriented parallel in the same direction. As a result of this, the mounting process between the components is automated with little outlay.

The pressure control valve 1 according to the invention preferably has a control block adapter 24 and/or a pilot valve adapter 25. It is clearly apparent in FIG. 2 that the pressure control valve 1 can have several planes, which as a result of the high number of channels must not be tangent to one another. Of course, the pressure control valve 1 can, however, also have all the channels in the same plane if the space and the configuration allows this, thus the adapters 24, 25 can also potentially be dispensed with and the starting block 3 and the pilot valve 4 are connected directly to the main valve 2 (not represented). It is apparent that the channels 7 in the main valve 2 run on one side of the axis 18 or in a plane 21 and likewise also in the adapters 24, 25 and then change plane, the channels 19, 20 in the control block 3 and in the pilot valve 4 thus run on the other side of the axis 18. It is clearly apparent in FIG. 2 how the change of plane is triggered. A push-in element 22 is shown which has an elongated shape as well as the corresponding receiving element 23 which also has an elongate shape. As a result of this, they represent a channel connector 26 which connects one channel 7 on one plane 21 to the other channel 19 on the other parallel running planes in a medium-impervious manner.

The connection between control block 3 and pilot valve 4 is preferably formed by line portions 27 which are also connected by simple pushing into the structural elements in a medium-impervious manner and ensure a conductance of medium between pilot valve 4 and control block.

FIG. 3 shows a three-dimensional representation of the pressure control valve 1 according to the invention. The compact design is clearly apparent and the fact that no lines protrude from the valve 1 or the individual components and, combined with another component, no screw connections for conducting medium between the components are present. Only fastening means 28 are fitted on the components or structural elements so that they are held together or mutually fixed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A pressure control valve for controlling the pressure of gaseous and liquid media in pipelines, comprising:
a main valve to which the pipeline is connected, wherein the main valve has a main valve housing, a guide cylinder, a valve element, channels for conducting the medium and a spring element, wherein the valve element and the guide cylinder are arranged concentrically to one another and the valve element is arranged displaceably on the guide cylinder, a control block, wherein the control block has channels for supplying the medium to the main valve and to the pilot valve and a pilot valve for control of the control pressure, wherein the pilot valve likewise has channels for conducting the medium, wherein the main valve, the control block and the pilot valve are connected to one another in a medium-impervious manner by means of plug connections.

2. The pressure control valve as claimed in claim 1, wherein the medium-conducting channels in the main valve, in the control block and in the pilot valve are connected to one another in a medium-impervious manner via the plug connections.

3. The pressure control valve as claimed in claim 1, wherein the pressure control valve has a direction of action for opening and closing the valve parallel to the direction of flow of the medium.

4. The pressure control valve as claimed in claim 1, wherein the plug connections on the main valve all lie in one plane, wherein the plane preferably extends parallel to the center axis and parallel to the vertical axis.

5. The pressure control valve as claimed in claim 1, wherein the channels on the main valve all lie in one plane, wherein the plane preferably extends parallel to the center axis and parallel to the vertical axis.

6. The pressure control valve as claimed in claim 1, wherein the plane is arranged in parallel offset to the vertically running axis or does not run through the center of the cylindrically formed main valve.

7. The pressure control valve as claimed in claim 1, wherein the plug connections are formed in each case by a push-in element and a receiving element, wherein the push-in element is arranged integrally on the structural element to be connected or is formed with the structural element as one part and is composed of the same material.

8. The pressure control valve as claimed in claim 1, wherein the plug connections are formed in each case by a push-in element and two receiving elements, wherein the push-in element is formed as a separate structural element.

9. The pressure control valve as claimed in claim 1, wherein the pressure control valve has no screw connections for medium-impervious connection of the channels.

10. The pressure control valve as claimed in claim 1, wherein the structural elements or components are fixed relative to one another by means of fastening means.

11. The pressure control valve as claimed in claim 1, wherein the conductance of medium between pilot and main valve and/or control block and main valve is not apparent from the outside or the channels run exclusively in the housings.

12. The pressure control valve as claimed in claim 1, wherein the pressure control valve has a control block adapter and/or a pilot valve adapter.

13. The pressure control valve as claimed in claim 1, wherein the plug connections between the control block adapter and the main valve and between the pilot valve adapter and the main valve are oriented parallel in the same direction.

14. The pressure control valve as claimed in claim 1, wherein at least two channels are arranged in each case in an adapter.

15. A use of a pressure control valve as claimed in claim 1, wherein the pressure control valve can be used as a pressure reduction valve and pressure retention valve, wherein the function of the pressure control valve can be changed by exchanging the control block and the pilot valve.

* * * * *